United States Patent
Zourob et al.

(10) Patent No.: US 12,223,022 B2
(45) Date of Patent: Feb. 11, 2025

(54) CONTROL OF USER PROFILES BASED ON BIOMETRICAL USER AUTHENTICATION IN AN ELECTRONIC USER DEVICE

(71) Applicant: Telefonaktiebolaget LM Ericsson (publ), Stockholm (SE)

(72) Inventors: Mohammed Zourob, Bunkeflostrand (SE); Alexander Hunt, Tygelsjö (SE); Andreas Kristensson, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 405 days.

(21) Appl. No.: 17/622,053

(22) PCT Filed: Jun. 28, 2019

(86) PCT No.: PCT/EP2019/067453
§ 371 (c)(1),
(2) Date: Dec. 22, 2021

(87) PCT Pub. No.: WO2020/259853
PCT Pub. Date: Dec. 30, 2020

(65) Prior Publication Data
US 2022/0318353 A1    Oct. 6, 2022

(51) Int. Cl.
*G06F 21/32*   (2013.01)
*G06F 3/041*   (2006.01)
*G06V 40/13*   (2022.01)

(52) U.S. Cl.
CPC .......... *G06F 21/32* (2013.01); *G06F 3/04166* (2019.05); *G06V 40/13* (2022.01)

(58) Field of Classification Search
CPC ...... G06F 21/32; G06F 3/04166; G06V 40/13
See application file for complete search history.

(56) References Cited

U.S. PATENT DOCUMENTS

2009/0279742 A1* 11/2009 Abiko ................ G06V 40/1335
                                                   382/107
2014/0283016 A1   9/2014 Sambamurthy et al.
(Continued)

FOREIGN PATENT DOCUMENTS

CN    104951681 A    9/2015
CN    105549868 A    5/2016
(Continued)

OTHER PUBLICATIONS

Author Unknown, "FPC Quicktouch: The Fastest Verification You Ever Made", Fingerprints, https://www.fingerprints.com/technology/features/fpc-quicktouch/, accessed Aug. 16, 2019, 2019, 1-2.
(Continued)

*Primary Examiner* — Yonas A Bayou
(74) *Attorney, Agent, or Firm* — Murphy, Bilak & Homiller, PLLC

(57) ABSTRACT

A method for transitioning between user profiles in an electronic user device during use of the electronic user device wherein the electronic user device comprises a fingerprint sensor operatively connected to a touch sensor of the electronic user device is disclosed. The method comprises sensing (103), by the fingerprint sensor, at least a part of a fingerprint at a determined position and area of a detected touch, and determining (104), by a fingerprint controller configured to control the fingerprint sensor, whether the sensed part of the fingerprint corresponds to a registered user of the electronic user device. The method further comprises, when the sensed part of the fingerprint corresponds to a registered user of the electronic user device, authenticating (105) the registered user based on the sensed fingerprint, and applying (106), by a settings controller configured to control the settings of the electronic user device, settings of a user profile associated with the registered user in the electronic user device. Corresponding
(Continued)

computer program product, apparatus, and system are also disclosed.

26 Claims, 7 Drawing Sheets

(56) References Cited

U.S. PATENT DOCUMENTS

| | | | | |
|---|---|---|---|---|
| 2015/0054764 | A1* | 2/2015 | Kim | G06V 40/13 345/173 |
| 2015/0074615 | A1 | 3/2015 | Han et al. | |
| 2015/0116086 | A1* | 4/2015 | Kim | G06V 40/1335 340/5.83 |
| 2015/0205623 | A1 | 7/2015 | Divincent et al. | |
| 2015/0371073 | A1* | 12/2015 | Cho | G06F 21/32 382/124 |
| 2016/0092018 | A1* | 3/2016 | Lee | G06F 1/1684 345/173 |
| 2016/0171281 | A1* | 6/2016 | Park | G06F 3/048 382/124 |
| 2016/0246396 | A1* | 8/2016 | Dickinson | G06F 3/043 |
| 2017/0126691 | A1 | 5/2017 | Arcese et al. | |
| 2017/0206398 | A1 | 7/2017 | Kim et al. | |
| 2017/0316250 | A1* | 11/2017 | Roh | G06F 3/0412 |
| 2018/0224999 | A1* | 8/2018 | Lee | H04W 12/06 |
| 2018/0225435 | A1* | 8/2018 | Blanch | G06F 3/041 |
| 2018/0330589 | A1* | 11/2018 | Horling | G08B 15/002 |
| 2019/0227602 | A1* | 7/2019 | Trim | G06F 1/1677 |

FOREIGN PATENT DOCUMENTS

| | | |
|---|---|---|
| CN | 105574378 A | 5/2016 |
| CN | 102930195 B | 12/2016 |
| CN | 106446648 A | 2/2017 |
| CN | 103678981 B | 12/2017 |
| EP | 3361404 A1 | 8/2018 |
| JP | 2006338510 A | 12/2006 |

OTHER PUBLICATIONS

Author Unknown, "FPC1145 Touch Fingerprint Sensor", Product Sheet, www.fingerprints.com, 2019, 1-2.

Author Unknown, "Use parental controls on your child's iPhone, iPad, and iPod touch", Apple Support, https://support.apple.com/en-ca/HT201304, accessed Aug. 16, 2019, 2019, 1-5.

Kelly, Gordon, "Apple Patents iPhone With Full Screen Touch ID", https://www.forbes.com/sites/gordonkelly/2019/02/05/apple-iphone-11-xs-max-xr-upgrade-sale-price-cost-new-iphone-touch-id/#54692200c50b, accessed Aug. 16, 2019, Feb. 5, 2019, 1-3.

Soneira, Raymond M., "iPhone X OLED Display Technology Shoot-Out", DisplayMate, www.displaymate.com/iPhoneX_ShootOut_1a.htm, accessed Aug. 16, 2019, 2019, 1-8.

* cited by examiner

CONTROL OF USER PROFILES BASED ON BIOMETRICAL USER AUTHENTICATION IN AN ELECTRONIC USER DEVICE

TECHNICAL FIELD

The present disclosure relates generally to the field of authentication in an electronic user device. More particularly, it relates to authentication of a user during use of the electronic user device.

BACKGROUND

Fingerprint sensors in electronic user devices for the purpose of authentication are known.

Examples of fingerprint sensors comprise fingerprint sensors that are separate from the screen of the electronic user device, i.e. a standalone fingerprint sensor, and ultrasonic or optical fingerprint sensors that are embedded under the actual screen using sound or burst of light to sense fingerprints on the screen of the electronic user device.

In the example of embedded fingerprint sensors, the fingerprint sensor may be localized to just a part of the screen of the electronic user device or to the whole screen of the electronic user device.

A first drawback of known authentication methods is that they are not intuitive and convenient. For example, if the electronic user device is to be used by different users that should have different access rights, known authentication methods require the owner of the electronic user device to modify the restrictions of the user profile every time the electronic user device is handed to another user e.g. siblings, children, friends, etc.

A second drawback of known authentication methods is that they require the owner of the electronic user device to enable and disable user modes, e.g. a guest mode, themselves.

Therefore, there is a need for alternative approaches for authentication.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other drawbacks.

According to a first aspect, this is achieved by a method for transitioning between user profiles in an electronic user device during use of the electronic user device wherein the electronic user device comprises a fingerprint sensor operatively connected to a touch sensor of the electronic user device.

The method comprises sensing, by the fingerprint sensor, at least a part of a fingerprint at a determined position and area of a detected touch, and determining, by a fingerprint controller configured to control the fingerprint sensor, whether the sensed part of the fingerprint corresponds to a registered user of the electronic user device.

The method further comprises, when the sensed part of the fingerprint corresponds to a registered user of the electronic user device, authenticating the registered user based on the sensed fingerprint, and applying, by a settings controller configured to control the settings of the electronic user device, settings of a user profile associated with the registered user in the electronic user device.

In some embodiments, the method further comprises determining, by a touch sensor controller configured to control the touch sensor, the position and the area of the detected touch on the touch sensor.

In some embodiments, the method further comprises repeating the steps for every detected touch on the touch sensor, or repeating the steps at a frequency corresponding to a set security level.

In some embodiments, the set security level is set by the registered user and/or owner of the electronic user device.

In some embodiments, the method further comprises scanning the touch sensor for detecting one or more touches on the touch sensor.

In some embodiments, the scanning of the touch sensor comprises scanning at least a part of the touch sensor on a first side of the electronic user device and/or at least a part of the touch sensor on a second side of the electronic user device and/or at least a part of the touch sensor on a third side of the electronic user device.

In some embodiments, the scanning of the touch sensor comprises scanning a whole area or a dedicated area of the touch sensor.

In some embodiments, use of the electronic user device is defined as the electronic user device being in an unlocked mode.

In some embodiments, the method further comprises setting the electronic user device in a locked mode in response to repeatedly determining that the sensed part of the fingerprint corresponds to a non-registered user of the electronic user device.

According to a second aspect, this is achieved by a method for registering user profiles for transitioning between user profiles in an electronic user device during use of the electronic user device wherein the electronic user device comprises a fingerprint sensor operatively connected to a touch sensor of the electronic user device.

The method comprises sensing, by the fingerprint sensor, at least a part of a fingerprint at the determined position and area of the detected touch, and determining, by a fingerprint controller configured to control the fingerprint sensor, whether the sensed part of the fingerprint corresponds to a non-registered user of the electronic user device.

The method further comprises, when the sensed part of the fingerprint corresponds to a non-registered user of the electronic user device, registering, by a registration controller configured to control registration of user profiles, the non-registered user by associating the sensed fingerprint to a user profile associated with the user to be registered.

In some embodiments, the method further comprises determining, by a touch sensor controller configured to control the touch sensor, the position and the area of the detected touch on the touch sensor.

In some embodiments, the method further comprises repeating the steps for every detected touch on the touch sensor, or repeating the steps at a frequency corresponding to a set security level.

In some embodiments, the set security level is set by a registered user and/or owner of the electronic user device.

In some embodiments, the method further comprises adjusting settings of the user profile associated with the user to be registered in the electronic user device.

In some embodiments, registering the non-registered user is performed during a specified time window.

In some embodiments, the registering the non-registered user further comprises storing the sensed fingerprint to a secure memory in the electronic user device.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for transitioning between user profiles in an electronic user device during use of the electronic user device wherein the electronic user device comprises a fingerprint sensor operatively connected to a touch sensor of the electronic user device.

The apparatus comprises a memory comprising executable instructions, one or more processors configured to communicate with the memory wherein the one or more processors are configured to cause sensing, by the fingerprint sensor, of at least a part of a fingerprint at a determined position and area of a detected touch, and determination, by a fingerprint controller configured to control the fingerprint sensor, of whether the sensed part of the fingerprint corresponds to a registered user of the electronic user device.

The one or more processors are further configured to cause, when the sensed part of the fingerprint corresponds to a registered user of the electronic user device, authentication of the registered user based on the sensed fingerprint, and application, by a settings controller configured to control the settings of the electronic user device, of settings of a user profile associated with the registered user in the electronic user device.

In some embodiments, the one or more processors are further configured to cause determination, by a touch sensor controller configured to control the touch sensor, of the position and the area of the detected touch on the touch sensor.

In some embodiments, the one or more processors are further configured to cause the apparatus to scan the touch sensor for detecting one or more touches on the touch sensor.

In some embodiments, the scan of the touch sensor further comprises scan of at least a part of the touch sensor on a first side of the electronic user device and/or at least a part of the touch sensor on a second side of the electronic user device and/or at least a part of the touch sensor on a third side of the electronic user device.

In some embodiments, the scan of the touch sensor comprises scan of a whole area or a dedicated area of the touch sensor.

In some embodiments, use of the electronic user device is defined as the electronic user device being in an unlocked mode.

In some embodiments, the one or more processors are further configured to cause the apparatus to set the electronic user device in a locked mode in response to repeated determination that the sensed part of the fingerprint corresponds to a non-registered user of the electronic user device.

A fifth aspect is an apparatus for registering user profiles for transitioning between user profiles in an electronic user device during use of the electronic user device wherein the electronic user device comprises a fingerprint sensor operatively connected to a touch sensor of the electronic user device.

The apparatus comprises a memory comprising executable instructions, one or more processors configured to communicate with the memory wherein the one or more processors are configured to cause sensing, by the fingerprint sensor, of at least a part of a fingerprint at a determined position and area of a detected touch, and determination, by a fingerprint controller configured to control the fingerprint sensor, of whether the sensed part of the fingerprint corresponds to a non-registered user of the electronic user device.

The one or more processors are further configured to cause, when the sensed part of the fingerprint corresponds to a non-registered user of the electronic user device, registration, by a registration controller configured to control registration of user profiles, of the non-registered user by associating the sensed fingerprint to a user profile associated with the user to be registered.

In some embodiments, the one or more processors are further configured to cause determination, by a touch sensor controller configured to control the touch sensor, of the position and the area of the detected touch on the touch sensor.

In some embodiments, the one or more processors are further configured to cause the apparatus to adjust settings of the user profile associated with the user to be registered in the electronic user device.

In some embodiments, the one or more processors are further configured to cause the apparatus to register the non-registered user during a specified time window.

In some embodiments, the one or more processors are further configured to cause the apparatus to store the sensed fingerprint to a secure memory in the electronic user device at registration of the non-registered user.

A sixth aspect is an arrangement comprising a fingerprint sensor operatively connected to a touch sensor comprising the apparatus according to any of the fourth and fifth aspects.

A seventh aspect is a wireless communication device comprising the apparatus according to any of the fourth and fifth aspects and/or the arrangement according to the sixth aspect.

An eighth aspect is a system for transitioning between user profiles in an electronic user device during use of the electronic user device wherein the electronic user device comprises a fingerprint sensor operatively connected to a touch sensor of the electronic user device.

The system comprises a sensing module configured to sense at least a part of a fingerprint by the fingerprint sensor at a determined position and area of a detected touch, and a determining module configured to determine, by a fingerprint controller configured to control the fingerprint sensor, whether the sensed part of the fingerprint corresponds to a registered user of the electronic user device.

The system further comprises an authenticating module configured to authenticate the registered user based on the sensed fingerprint, and a settings module configured to apply settings of a user profile associated with the registered user in the electronic user device by a settings controller configured to control the settings of the electronic user device.

In some embodiments, the system further comprises a determining module configured to determine the position and the area of the detected touch on the touch sensor by a touch sensor controller configured to control the touch sensor.

In some embodiments, the system further comprises a scanning module configured to scan the touch sensor for detecting one or more touches on the touch sensor.

In some embodiments, the system further comprises a locking module configured to set the electronic user device in a locked mode in response to repeated determining of a non-registered user of the electronic user device.

A ninth aspect is a system for registering user profiles for transitioning between user profiles in an electronic user device during use of the electronic user device wherein the electronic user device comprises a fingerprint sensor operatively connected to a touch sensor of the electronic user device.

The system comprises a sensing module configured to sense at least a part of a fingerprint by the fingerprint sensor at a determined position and area of a detected touch, and a determining module configured to determine, by a fingerprint controller configured to control the fingerprint sensor, whether the sensed part of the fingerprint corresponds to a non-registered user of the electronic user device.

The system further comprises a registering module configured to register, by a registration controller configured to control registration of user profiles, the non-registered user by associating the sensed fingerprint to a user profile associated with the user to be registered.

In some embodiments, the system further comprises a determining module configured to determine the position and the area of the detected touch on the touch sensor by a touch sensor controller configured to control the touch sensor.

In some embodiments, the system further comprises a settings module configured to adjust settings of the user profile associated with the user to be registered in the electronic user device.

In some embodiments, the system further comprises a storage module configured to store the sensed fingerprint to a secure memory in the electronic user device.

In some embodiments, any of the above aspects may additionally have features identical with or corresponding to any of the various features as explained above for any of the other aspects.

An advantage of some embodiments is that alternative approaches for authentication are provided.

Another advantage of some embodiments is that a streamlined process of sharing of an electronic user device may be provided.

Yet an advantage of some embodiments is that the need for passwords and codes may be eliminated.

Yet another advantage of some embodiments is that a plurality user profiles comprising unique settings may be applied in the same electronic user device.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, a first drawback of known authentication methods is that they are not intuitive and convenient as they require the owner of the electronic user device to modify the restrictions of the user profile every time the electronic user device is handed to another user (e.g. siblings, children, friends etc.) that should have different access rights.

As mentioned above, a second drawback of known authentication methods is that they require the owner of the electronic user device to enable and disable user modes themselves.

In the following, embodiments will be presented where alternative approaches for authentication are described.

Figure 1:
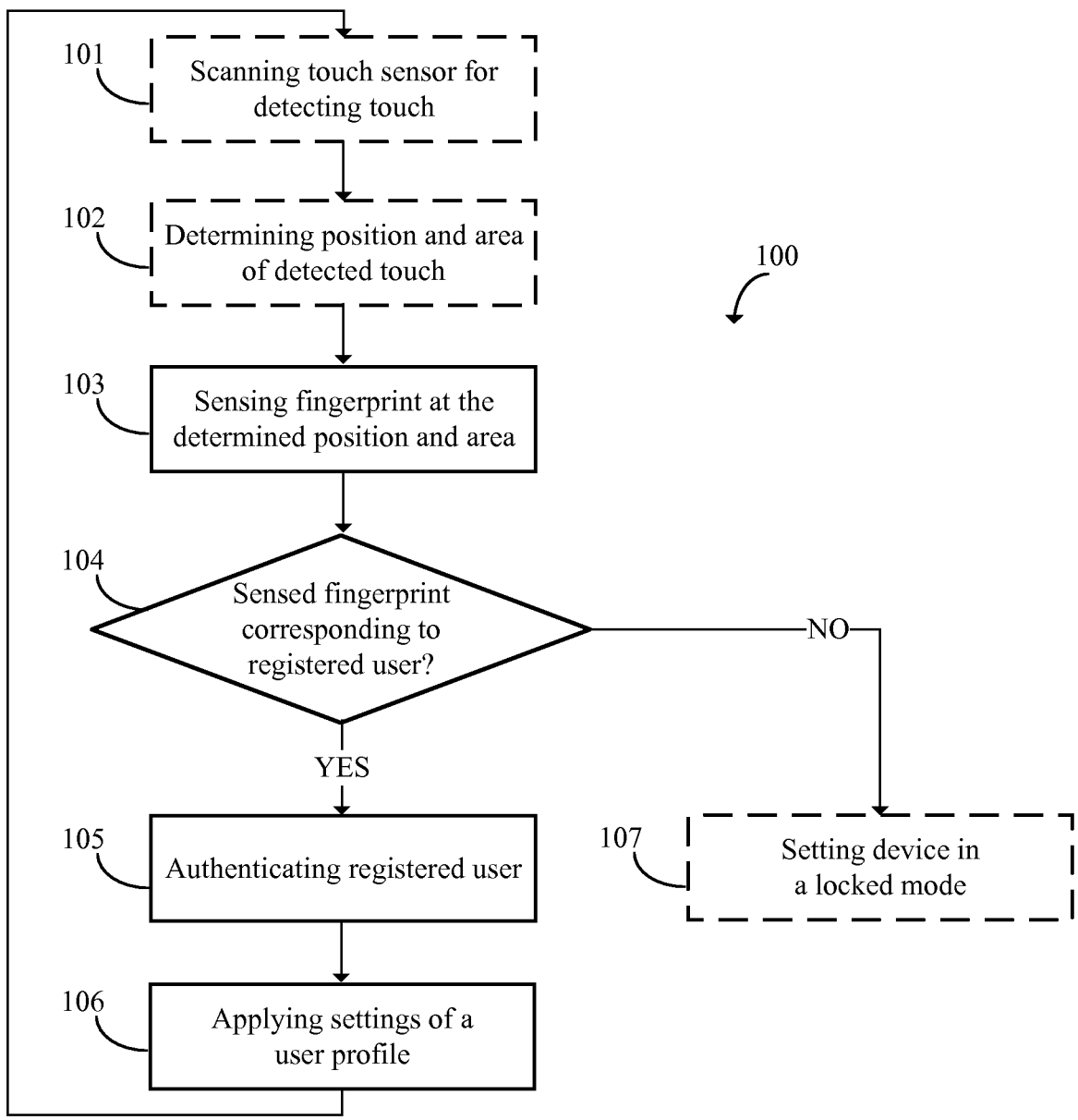
FIG. 1 is a flowchart illustrating example method steps according to some embodiments.

FIG. 1 is a flowchart illustrating method steps of an example authentication method 100 according to some embodiments. The authentication method 100 is for transitioning between user profiles in an electronic user device during use of the electronic user device wherein the electronic user device comprises a fingerprint sensor operatively connected to a touch sensor of the electronic user device. Thus, the authentication method 100 may, for example, be performed by the apparatus 300b of FIG. 3b and/or the arrangement 400 of FIG. 4 and/or the computer program product 500 of FIG. 5.

Alternatively or additionally, transitioning between user profiles may comprise seamlessly transitioning between user profiles in the electronic user device.

The authentication method 100 comprises the following steps.

In step 101, in some embodiments, one or more touches is scanned for by a touch sensor configured for detecting one or more touches on the touch sensor.

For example, the touch sensor may comprise a screen covering the whole front of the electronic user device or a side button of the electronic user device or a dedicated area the back of the electronic user device. The touch sensor, as mentioned above, is operatively connected to the fingerprint sensor on the electronic user device wherein the fingerprint sensor may be implemented in an embedded manner under the touch sensor or separately.

Alternatively or additionally, the touch sensor may be integrated with the fingerprint sensor or the fingerprint sensor may be integrated with the touch sensor.

In step 102, in some embodiments, a position and an area of a detected touch on the touch sensor is determined by a touch sensor controller configured to control the touch sensor.

For example, the position and the area may comprise coordinates indicative of a detected finger position on the touch sensor and a size of an area centred around the coordinates of the finger position.

In step 103, at least part of the fingerprint is sensed by the fingerprint sensor at the determined position and area of the detected touch.

For example, the fingerprint sensor may comprise a capacitive, ultrasonic, or optical fingerprint sensor and wherein the fingerprint sensor may either be embedded under the touch sensor or separate from the touch sensor and in both cases the fingerprint sensor is operatively connected to the touch sensor either via a direct connection or an indirect connection e.g. via other components in an electronic user device.

Alternatively or additionally, the touch sensor may be integrated with the fingerprint sensor or the fingerprint sensor may be integrated with the touch sensor.

For example, the sensing may comprise reading or scanning fingerprint information from the ridges of a fingerprint.

In step 104, it is determined by a fingerprint controller configured to control the fingerprint sensor whether the sensed part of the fingerprint corresponds to a registered user of the electronic user device.

For example, the registered user may comprise a user that has been registered at a point in time prior to the sensing of the fingerprint and which is associated with a user profile.

In step 105, the registered user is authenticated based on the sensed fingerprint when the sensed at least part of the fingerprint corresponds to a registered user of the electronic user device (YES—path out of step 104).

For example, the authentication may comprise a verification of that the sensed at least part of the fingerprint corresponds to a registered user of the electronic user device.

In step 106, settings of a user profile associated with the registered user are applied by a settings controller in the electronic user device configured to control the settings of the electronic user device.

For example, the user profile may comprise any setting of the electronic user device that may be adjusted, e.g. no access to settings of the electronic user device, applications that have been restricted for the user, e.g. no access to the owner's email client, based on the user's privileges, and time of use of the electronic user device or any other setting of the electronic user device that may be possibly configurable i.e. setting possible to set or adjust or modify.

Hence, the user profile will detail the restrictions on usage for the electronic device in terms of access, content, privileges, usage time and frequency of authentication.

Alternatively or additionally, anytime a registered user touches the touch sensor, e.g. the screen of the electronic user device, the associated user profile is loaded in the electronic user device and the registered user may proceed with using the electronic user device according to the settings of the user profile. Continued authentication may be performed during the whole period of usage by sensing at least a part of the fingerprint at every detected touch on the touch sensor or at a frequency corresponding to a set security level. If a non-registered user touches the touch sensor several times consecutively, then the device locks.

In step 107, in some embodiments, the electronic user device is set in a locked mode in response to repeatedly determining that the sensed part of the fingerprint corresponds to a non-registered user of the electronic user device (NO-path out of step 104).

For example, the locked mode may comprise a mode wherein the electronic user device has locked its functions and wherein authentication is required in order to change mode.

For example, the repeatedly determining may comprise a number of consecutive fails and wherein the number may be set by the owner of the electronic user device or be set by default in the electronic user device.

In some embodiments, above steps are repeated for every detected touch on the touch sensor, or repeated at a frequency corresponding to a set security level.

For example, the detected touch may comprise a touch sensor receiving input from the user in the form of the touch of a finger on the touch sensor.

For example, the frequency corresponding to the set security level may comprise sensing at least a part of the fingerprint e.g. per time interval (e.g. every fifth second) or per touch occurrence (e.g. every fifth touch).

In some embodiments, the set security level is set by the registered user and/or owner of the electronic user device.

For example, the registered user and/or the owner of the electronic user device may be enabled to control the parameters of the authentication method 100 by deciding on a level of security, e.g. Low/Mid/High, while considering that a higher level of protection would come at the expense of higher power consumption in the electronic user device.

In some embodiments, the scanning of the touch sensor comprises scanning at least a part of the touch sensor on a first side of the electronic user device and/or at least a part of the touch sensor on a second side of the electronic user device and/or at least a part of the touch sensor on a third side of the electronic user device.

For example, the first side of the electronic user device may comprise the front of the electronic user device (e.g., a side of the electronic user device where a main display is located), the second side of the electronic user device may comprise the side of the electronic user device, and the third side of the electronic user device may comprise the back of the electronic user device (e.g., an opposite side of the electronic user device to a side where a main display is located).

In some embodiments, the scanning of the touch sensor comprises scanning a whole area or a dedicated area of the touch sensor.

For example, the whole area may comprise the complete area of the touch sensor configured for detecting one or more touches on the touch sensor and the dedicated area may comprise a subset of the whole area of the touch sensor configured for detecting one or more touches on the touch sensor.

In some embodiments, use of the electronic user device is defined as the electronic user device being in an unlocked mode.

For example, the unlocked mode may comprise the electronic user device being in a mode wherein applications may be accessible, settings may be changeable, and the electronic user device being in use i.e. at a time after authentication and before the electronic user mode has returned in to a locked mode.

An advantage of some embodiments is that alternative approaches for authentication are provided.

Another advantage of some embodiments is that a streamlined process of sharing of an electronic user device may be provided which may be especially advantageous for parental control of electronic user devices.

Yet an advantage of some embodiments is that the need for passwords and codes may be eliminated which may provide enhanced user friendliness.

Yet another advantage of some embodiments is that a plurality user profiles comprising unique settings may be applied in the same electronic user device which may provide versatility and flexibility in contrast to having only one guest setting or one parental setting.

Figure 2:
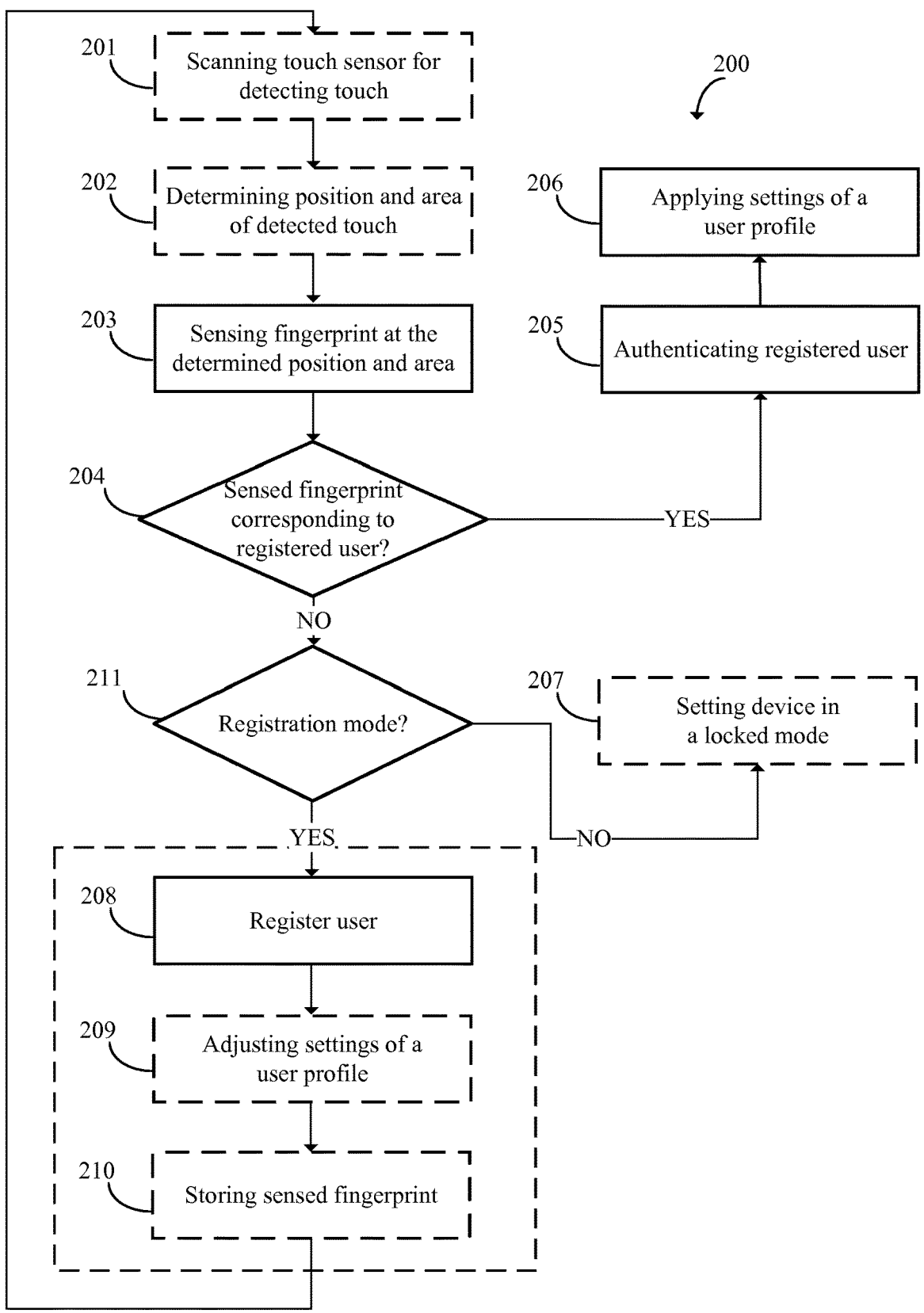
FIG. 2 is a flowchart illustrating example method steps according to some embodiments.

FIG. 2 is a flowchart illustrating method steps of an example registration method 200 according to some embodiments. The registration method 100 is for registering user profiles for transitioning between user profiles in an electronic user device during use of the electronic user device wherein the electronic user device comprises a fingerprint sensor operatively connected to a touch sensor of the electronic user device. Thus, the registration method 200 may, for example, be performed by the apparatus 300b of FIG. 3b and/or the arrangement 400 of FIG. 4 and/or the computer program product 500 of FIG. 5.

The registration method 200 comprises following steps.

In step 201 corresponding to step 101 of FIG. 1, in some embodiments, one or more touches is scanned for by a touch sensor configured for detecting one or more touches on the touch sensor.

In step 202 corresponding to step 102 of FIG. 1, in some embodiments, a position and an area of a detected touch on the touch sensor is determined by a touch sensor controller configured to control the touch sensor.

In step 203 corresponding to step 103 of FIG. 1, at least part of the fingerprint is sensed by the fingerprint sensor at the determined position and area of the detected touch.

In step 204 corresponding to step 104 of FIG. 1, it is determined by a fingerprint controller configured to control the fingerprint sensor whether the sensed part of the fingerprint corresponds to a registered user of the electronic user device.

In step 205 corresponding to step 105 of FIG. 1, the registered user is authenticated based on the sensed fingerprint (YES—path out of step 204).

In step 206 corresponding to step 106 of FIG. 1, settings of a user profile associated with the registered user are applied by a settings controller in the electronic user device configured to control the settings of the electronic user device.

In step 211, it is determined whether the electronic user device is in a registration mode.

Following steps 208, 209, and 210 are performed in the registration mode of the electronic user device wherein the registration mode is preferably controlled by the owner or the primary user of the electronic user device.

Hence, the registration mode may be entered by the owner or the primary user of the electronic user device e.g. once there is no registered user corresponding to the sensed fingerprint or independently from steps 201, 202, 203, and 204.

In step 208, a non-registered user is registered by a registration controller configured to control registration of user profiles by associating the sensed fingerprint to a user profile associated with the user to be registered (YES—path out of step 211).

For example, the associating of the sensed fingerprint to a user profile associated with the user to be registered may comprise storing sensed and processed fingerprint information in a dedicated area in the secure memory in the electronic user device for linking to the user profile.

For example, the user profile will detail the restrictions on usage for the electronic device in terms of access, content, privileges, usage time and frequency of authentication.

Alternatively or additionally, owner A of the electronic user device may establish a user profile and adjust settings of the user profile for user B once, i.e. the first time, and then hand over the device to user B in an unlocked mode for transitioning from owner A user profile to the user B user profile. The electronic user device will then sense and process fingerprint information of user B during a specified time window and store the fingerprint information in a secure memory in the electronic user device for linking to the user profile of user B. The user profile will detail the restrictions on the usage of user B for the electronic user device in terms of access, content, privileges, usage time and frequency of authentication. Anytime user B touches the screen after the first setup, the associated user profile is applied and the user can proceed with using the device accordingly. Continued authentication may be performed during the whole period of usage by sensing at least a part of the fingerprint at every detected touch on the touch sensor. If a non-registered user touches the touch sensor several times consecutively, then the device locks.

In step 209, in some embodiments, settings of the user profile associated with the user to be registered in the electronic user device are adjusted.

For example, the adjusting may comprise restricting access to certain applications or settings in the electronic user device or time of use of the electronic user device.

Hence, For example, the user profile will detail the restrictions on usage for the electronic device in terms of access, content, privileges, usage time and frequency of authentication.

In step 210, in some embodiments, the sensed fingerprint is stored to a secure memory in the electronic user device at the registering of the non-registered user.

For example, the secure memory may comprise a secure environment for storing sensed and processed fingerprint information e.g. Trust Zone.

In step 207, in some embodiments, the electronic user device is set in a locked mode in response to repeatedly determining that the sensed part of the fingerprint corresponds to a non-registered user of the electronic user device a non-registered user and while the device is not in a registration mode (NO—path out of step 211).

In some embodiments, above steps are repeated for every detected touch on the touch sensor, or repeated at a frequency corresponding to a set security level.

For example, the detected touch may comprise a touch sensor receiving input from the user in the form of the touch of a finger on the touch sensor.

For example, the frequency corresponding to the set security level may comprise sensing at least a part of the fingerprint e.g. per time interval (e.g. every fifth second) or per touch occurrence (e.g. every fifth touch).

In some embodiments, the set security level is set by the registered user and/or owner of the electronic user device.

For example, the registered user and/or the owner of the electronic user device may be enabled to control the parameters of the registration method 200 by deciding on a level of security, e.g. Low/Mid/High, while considering that a higher level of protection would come at the expense of higher power consumption in the electronic user device.

For example, security level Low may be configured to sense at least a part of a fingerprint only when jumping between applications in the electronic user device and not while using an application. It can also define a higher number of failed matches before the device is ultimately locked.

For example, security level Medium may be configured to sense at least a part of a fingerprint while using an application, compared to the security level Low, e.g. every tenth second and/or every tenth readable fingerprint.

For example, security level High may be configured to sense at least a part of a fingerprint for every detected touch on the touch sensor with less tolerance for failed matchings.

Hence, the security level Low prioritizes power and the security level High level prioritizes security.

Additionally or alternatively, the condition of the electronic user device's power could be taken into consideration in deciding which security level should be used.

In some embodiments, the registering of the non-registered user is performed during a specified time window.

For example, the specified time window may be 60 seconds and may be set by the owner of the electronic user device or be set as default in the electronic user device.

Figure 3A:
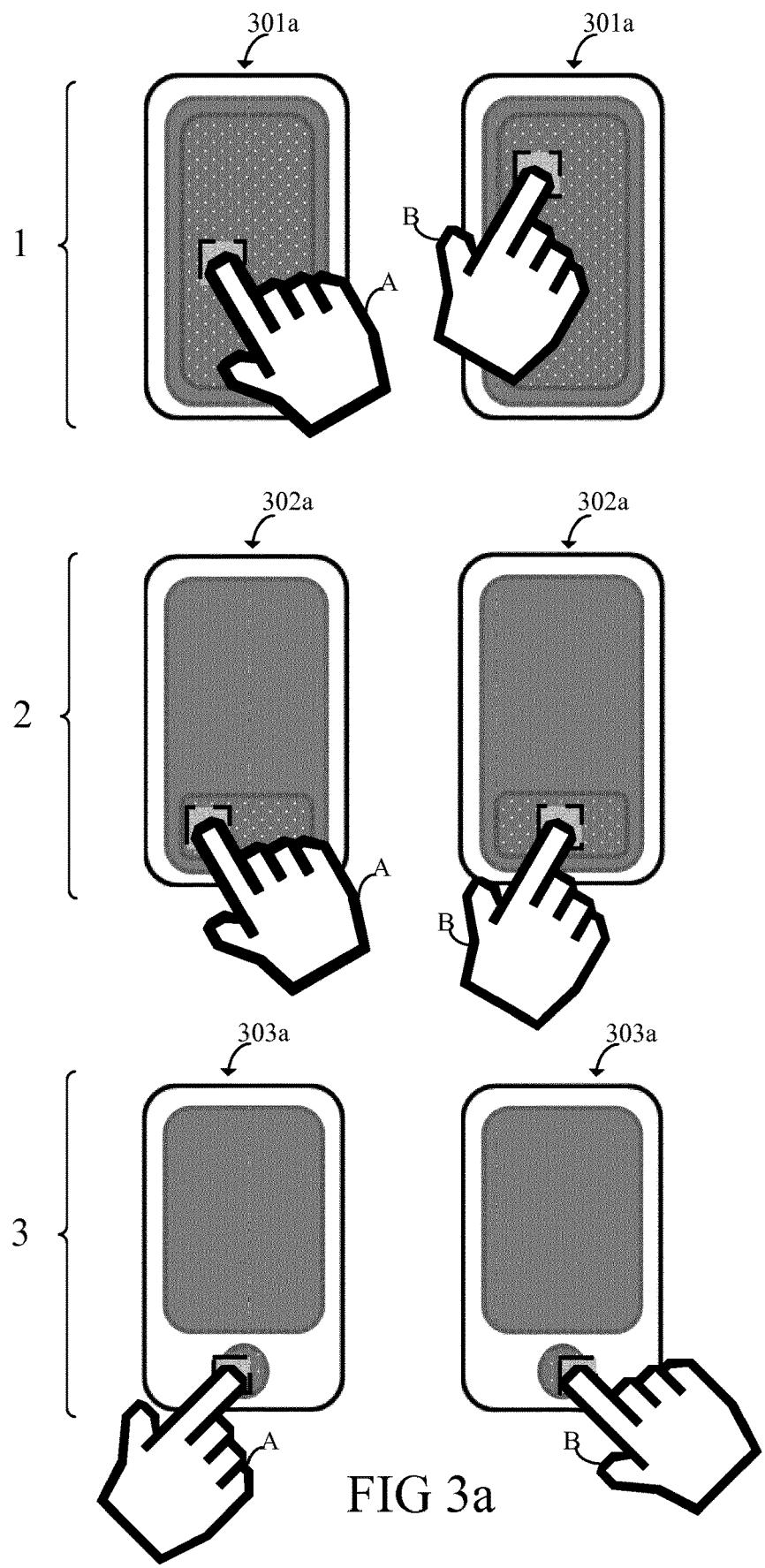
FIG. 3a is a schematic drawing illustrating example use cases according to some embodiments.

FIG. 3a is a schematic drawing illustrating various use cases of example electronic user devices 301a, 302a, and 303a according to some embodiments. The example electronic user devices 301a, 302a, and 303a are for registering user profiles and for transitioning between user profiles in an electronic user device during use of the electronic user device wherein the electronic user device comprises a fingerprint sensor operatively connected to a touch sensor of the electronic user device. Thus, the example electronic user devices 301a, 302a, and 303a may, for example, perform the method steps of any of FIG. 1, FIG. 2, FIG. 3c, and FIG. 3d.

The first use case "1" illustrates an electronic user device 301a comprising a fingerprint sensor spanning over the whole area of the touch sensor, i.e. the dotted area, and scans for sensing at least a part of a fingerprint. User A is authenticated by sensing the fingerprint of user A by the fingerprint sensor at a position and area on the touch sensor area at a detected touch on the touch sensor. At authentication of user A, the user profile associated to user A is loaded in the electronic user device 301a and the settings of the user profile are applied.

As the electronic user device 301a is handed over to user B in an unlocked mode user B is authenticated by sensing the fingerprint of user B by the fingerprint sensor at a position and area on the touch sensor area at a detected touch on the touch sensor. At authentication of user B, the user profile associated to user B is loaded in the electronic user device 301a and the settings of the user profile are applied.

The detected touches on the touch sensor of users A and B may be at different positions and areas on the whole area of the touch sensor and detected accordingly by the touch sensor.

The second use case "2" illustrates an electronic user device 302a comprising a fingerprint sensor spanning over a dedicated area of the touch sensor, i.e. the dotted area, or another dedicated area of the touch sensor, and scans in the dedicated area for sensing at least a part of a fingerprint. User A is authenticated by sensing the fingerprint of user A in the dedicated area by the fingerprint sensor at a position and area on the dedicated area of the touch sensor area at a detected touch on the touch sensor. At authentication of user A, the user profile associated to user A is loaded in the electronic user device 302a and the settings of the user profile are applied.

As the electronic user device 302a is handed over to user B in an unlocked mode user B is authenticated by sensing the fingerprint of user B by the fingerprint sensor at a position and area in the dedicated area on the touch sensor area at a detected touch on the touch sensor. At authentication of user B, the user profile associated to user B is loaded in the electronic user device 301a and the settings of the user profile are applied.

The detected touches on the touch sensor of users A and B may be at different positions and areas on the dedicated area of the touch sensor and detected accordingly by the touch sensor.

The third use case "3" illustrates an electronic user device 303a comprising a fingerprint sensor, i.e. the dotted area, separately positioned on the electronic user device from the touch sensor although operatively connected with each other and scans in the dedicated area for sensing at least a part of a fingerprint. User A is authenticated by sensing the fingerprint of user A in the dedicated area by the fingerprint sensor at a position and area in the dedicated area of the touch sensor area at a detected touch on the touch sensor. At authentication of user A, the user profile associated to user A is loaded in the electronic user device 303a and the settings of the user profile are applied.

As the electronic user device 303a is handed over to user B in an unlocked mode user B is authenticated by sensing the fingerprint of user B by the fingerprint sensor at a position and area in the dedicated area on the touch sensor area at a detected touch on the touch sensor. At authentication of user B, the user profile associated to user B is loaded in the electronic user device 301a and the settings of the user profile are applied.

The detected touches on the touch sensor of users A and B may be at different positions and areas on the dedicated area of the touch sensor and detected accordingly by the touch sensor.

For example, in an additional use case (not shown), user A owns the electronic user device and wants to lend it to user B. However, user B is only allowed by user A to use the electronic device as a photography device and therefore allows editing for pictures taken by user B. Any other activities should not be allowed. User A would set the profile in a way to allow access to the camera, microphone, speaker, and any photos that are taken/signed by user B's profile. Once the profile is set, the device is handed from user A to user B in an unlocked mode and user B's fingerprints are sensed by the fingerprint sensor. The time window for sensing the fingerprints, e.g. 60 seconds, can be set to a default or set by the user A. The sensed and processed fingerprint information is stored and tied to user B's user profile. For user B, the electronic user device has become merely a camera and user B cannot access any content of user A, make phone calls (except emergency) or send messages. Even if the electronic user device is locked due to inactivity for a while, user B may simply touch the touch sensor and the user profile will be activated again based on the sensed fingerprint and there would be no need for user A to re-authenticate the usage of the electronic user device by user B.

For example, in yet an additional use case (not shown), user A owns the electronic user device and the electronic user device is occasionally used by user A's two children e.g. 16 years old (user B) and 6 years old (user C). Two age appropriate user profiles are established and adjusted settings wise by user A for user B and user C with different usage times. The first time the electronic user device is handed to user B and user C, their fingerprints are sensed by a fingerprint sensor and linked to their respective user profile. The time window for sensing and processing fingerprint information and storing and linking to the user profile of user B and user C, e.g. 60 seconds, can be set to a default or set by the user A. Hence, user A is alleviated of the task of modifying the user profile every time one of user B or user C is borrowing the electronic user device, or authenticate the usage. The electronic user device may be simply handed from one of user B or user C to the other and the electronic user device would seamlessly switch, i.e. transition, between profiles without involving user A and without the task of modifying the user profile.

Figure 3B:
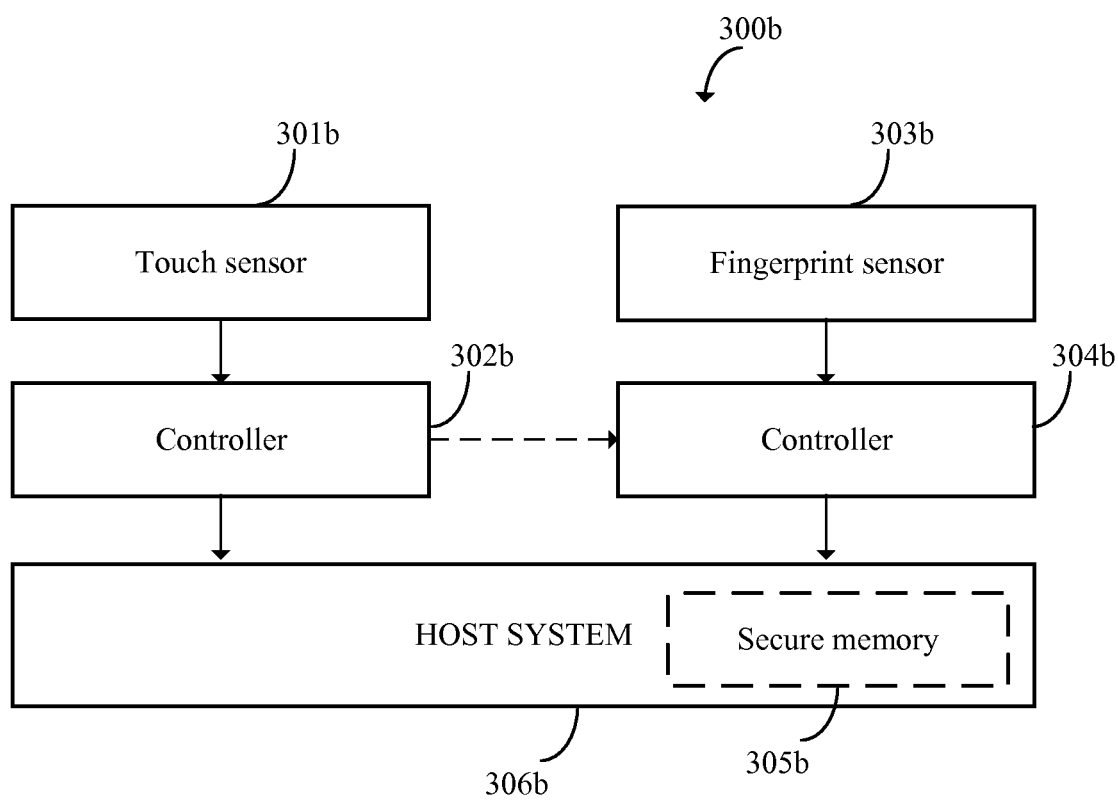
FIG. 3b is a schematic block diagram illustrating an example apparatus according to some embodiments.

FIG. 3b is a schematic block diagram illustrating an example apparatus 300b according to some embodiments. The example apparatus 300b is for registering user profiles and for transitioning between user profiles in an electronic user device during use of the electronic user device wherein the electronic user device comprises a fingerprint sensor operatively connected to a touch sensor of the electronic user device. Thus, the example apparatus 300b may, for example, perform the method steps of any of FIG. 1, FIG. 2, FIG. 3c, and FIG. 3d.

The apparatus 300b comprises a host system 306b configured to comprise, in some embodiments, a secure memory 305b (e.g., a secure environment, Trust Zone etc.) configured for storing, e.g., sensed fingerprint information for registration and authentication purposes. The host system 306b is further operatively connected to a fingerprint sensor 303b configured for sensing at least a part of fingerprint, a fingerprint sensor controller 304b configured to control the fingerprint sensor 303b, a touch sensor 301b configured to detect a touch on a touch sensor area, and a touch sensor controller 302b configured to control the touch sensor 301b.

The touch sensor controller 302b is configured to determine a position and area of a detected touch on the touch sensor 301b and especially in the use case of the fingerprint sensor spanning over the whole area of the touch sensor, the determination of the position and area of the detected touch provides less power consumption as the fingerprint sensor only senses in the determined position and area of the detected touch.

In some embodiments, the input from the touch sensor controller i.e. detection of a touch and determination of position and area of detected touch may be sent directly to the fingerprint sensor controller without passing through the host system 306b.

Figure 3C:
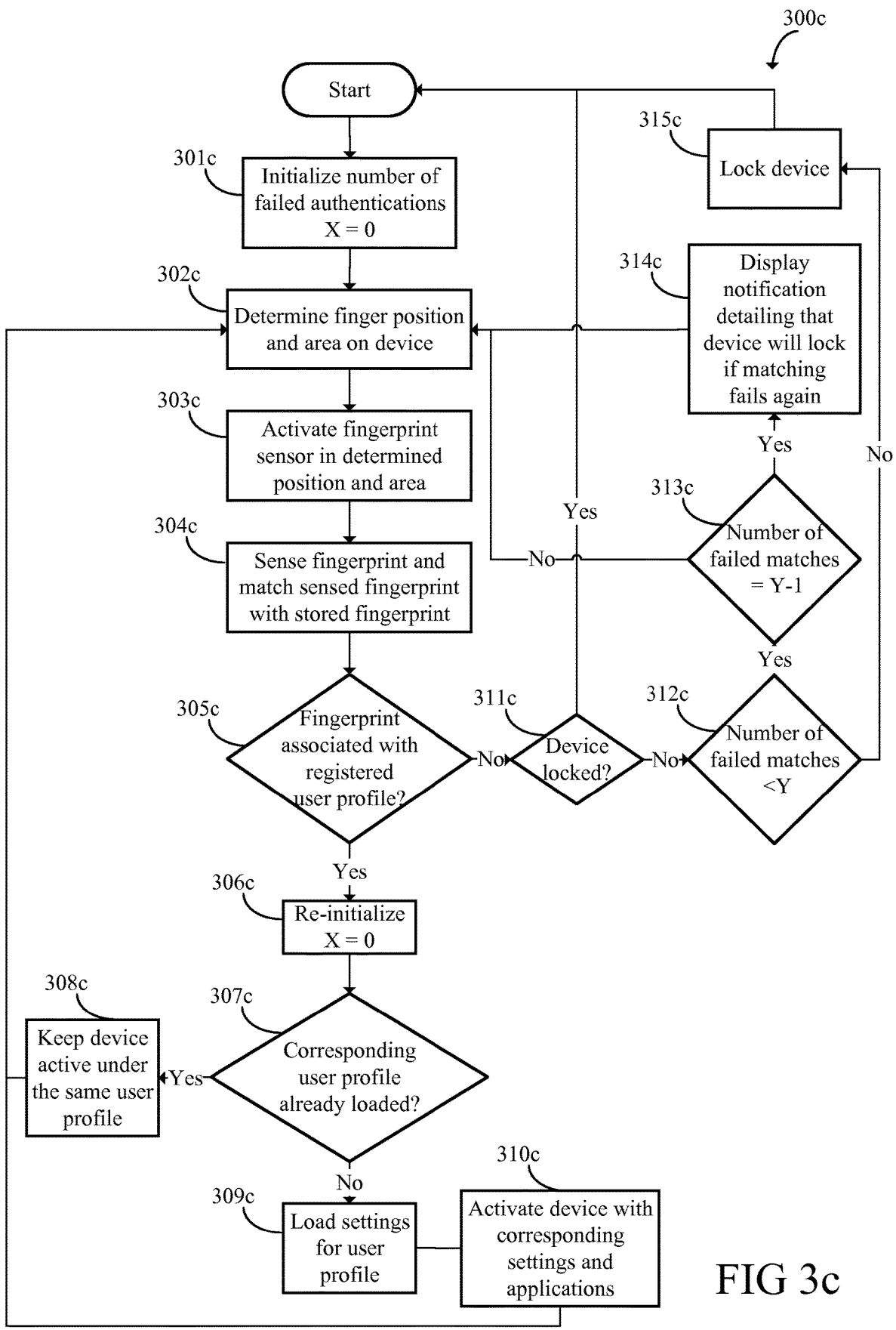
FIG. 3c is a flowchart illustrating example method steps according to some embodiments.

FIG. 3c is a flowchart illustrating method steps of an example authentication method 300c according to some embodiments. The authentication method 300c is for transitioning between user profiles in an electronic user device during use of the electronic user device wherein the electronic user device comprises a fingerprint sensor operatively connected to a touch sensor of the electronic user device. Thus, the authentication method 300c may, for example, be performed by the apparatus 300b of FIG. 3b and/or the arrangement 400 of FIG. 4 and/or the computer program product 500 of FIG. 5.

The authentication method 300c comprises following steps.

In step 301c, a number X, i.e. a counter value, of failed authentications is initialized to 0 when a user profile is accessed.

In step 302c, a finger position and area of a detected touch on a touch sensor area is determined.

In step 303c, a fingerprint sensor is activated for sensing at least a part of a fingerprint at the determined position and area of the detected touch on the touch sensor area.

In step 304c, the at least part of the fingerprint is sensed accordingly and matched, i.e. compared for verification, with stored fingerprint information.

In step 305c, it is determined whether the sensed fingerprint is associated with a registered user profile.

In step 306c, when it is determined that the sensed fingerprint is associated with a registered user profile then re-initialize the counter value X=0.

In step 307c, it is determined whether the corresponding user profile is already loaded in the electronic user device.

In step 308c, when it is determined that the corresponding user profile is already loaded in the electronic user device then the device is kept active under the same user profile.

In step 309c, when it is determined that the corresponding user profile is not already loaded in the electronic user device then settings of the user profile for the registered are loaded and user authenticated even in an unlocked mode of the electronic user device and while in use.

In step 310c, the electronic user device is activated with corresponding settings and applications of the user profile.

In step 311c, it is determined whether the device is locked.

In step 312c, when it is determined that the device is not locked then it is determined whether the number of failed matches is less than a limit number Y, i.e. a limit value or a threshold value, of failed matches.

In step 313c, it is determined whether the number of failed matches is equal to Y−1 and when it is determined that is less than Y−1 then returning to step 302c and repeating above steps.

In step 314c, when it is determined that the number of failed matches is equal to Y−1 then a notification is displayed detailing that the electronic user device will lock if matching fails again and then returning to step 302c and repeating above steps.

In step 315c, the electronic user device is locked.

Figure 3D:
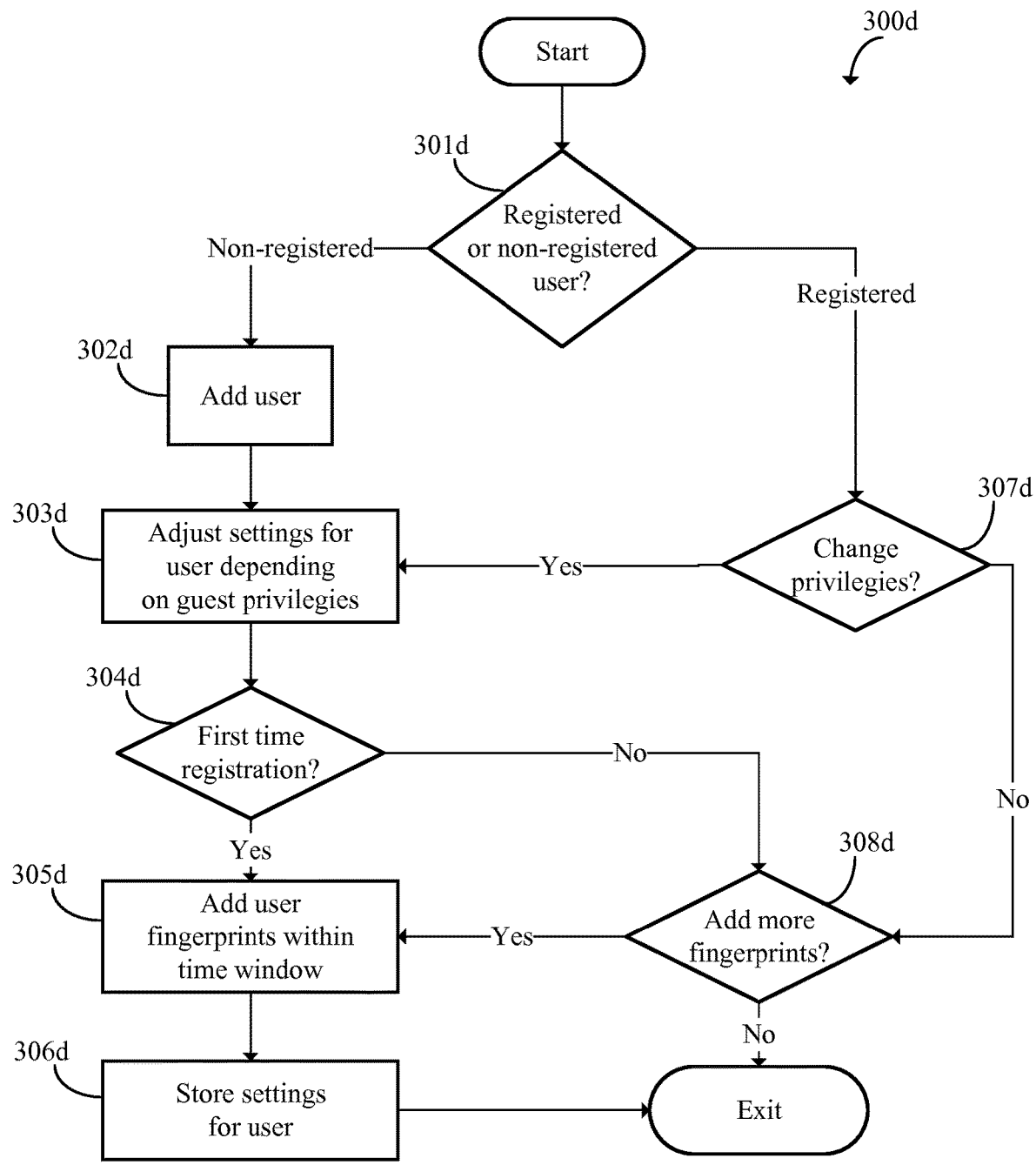
FIG. 3d is a flowchart illustrating example method steps according to some embodiments.

FIG. 3d is a flowchart illustrating method steps of an example registration method 300d according to some embodiments. The registration method 300d is for registering user profiles for transitioning between user profiles in an electronic user device during use of the electronic user device wherein the electronic user device comprises a fingerprint sensor operatively connected to a touch sensor of the electronic user device. Thus, the registration method 200 may, for example, be performed by the apparatus 300b of FIG. 3b and/or the arrangement 400 of FIG. 4 and/or the computer program product 500 of FIG. 5.

The registration method 300d comprises following steps.

In step 301d, it is determined whether the sensed fingerprint matches stored fingerprint information in the electronic user device i.e. for a registered user or if the sensed fingerprint does not match any stored fingerprint information in the electronic user device i.e. for a non-registered user.

In step 302d, when it is determined that the sensed fingerprint corresponds to a non-registered user of the electronic user device then the non-registered user is added with the purpose of establishing a user profile for registering the non-registered user.

For example, a name for the user profile will be requested e.g. user B.

In step 303d, settings of the user profile are adjusted depending on the privileges of the user to be registered.

For example, owner A selects the restrictions on the usage of the electronic user device by user B in terms of access, content, privileges, usage time and frequency of authentication.

In step 304d, it is determined whether the registration is a first time registration.

In step 305*d*, when it is determined that the registration is a first time registration then fingerprints of the user to be registered are added within a set time window.

For example, owner A may hand over the electronic user device to user B for adding the fingerprints of user B to the user profile for user B who will proceed to use the electronic user device by touching the touch sensor while the fingerprint sensor senses at least a part of a fingerprint, preferably a number of different fingerprints, for storage in a secure memory. The user B may be notified of how many fingerprints have been sensed, processed and stored. The registration according to above may be performed within a predefined time window set by owner A e.g. 60 seconds. Once the 60 seconds are up, the settings and sensed and processed fingerprint information will be stored for association to user profile of user B.

In step 306*d*, settings of the user profile are stored.

In step 307*d*, when it is determined that the sensed fingerprint corresponds to a registered user of the electronic user device then it is determined whether the privileges of the registered user are to be changed and when it is determined that the privileges are to be changed then proceeding to step 303*d* and repeating above steps.

For example, owner A accesses the user profile of the registered user B and adjusts the settings and alternatively or additionally the owner A hands over the electronic user device to user B for sensing additional fingerprints of user B to be stored in secure memory in the electronic user device for association to the user profile of user B. User B would then proceed with using the electronic user device by touching the touch sensor with different fingers while the fingerprint sensor senses at least a part of a fingerprint for storage in a secure memory, to ensure additional fingerprints are sensed and processed. The user B may be notified of how many fingerprints have been sensed, processed and stored.

In step 308*d*, when in step 304*d* it is determined that the registration is not a first time registration and/or when in step 307*d* it is determined that the privileges are not to be changed. It is determined whether further fingerprint information is to be added in the electronic user device.

Figure 4:
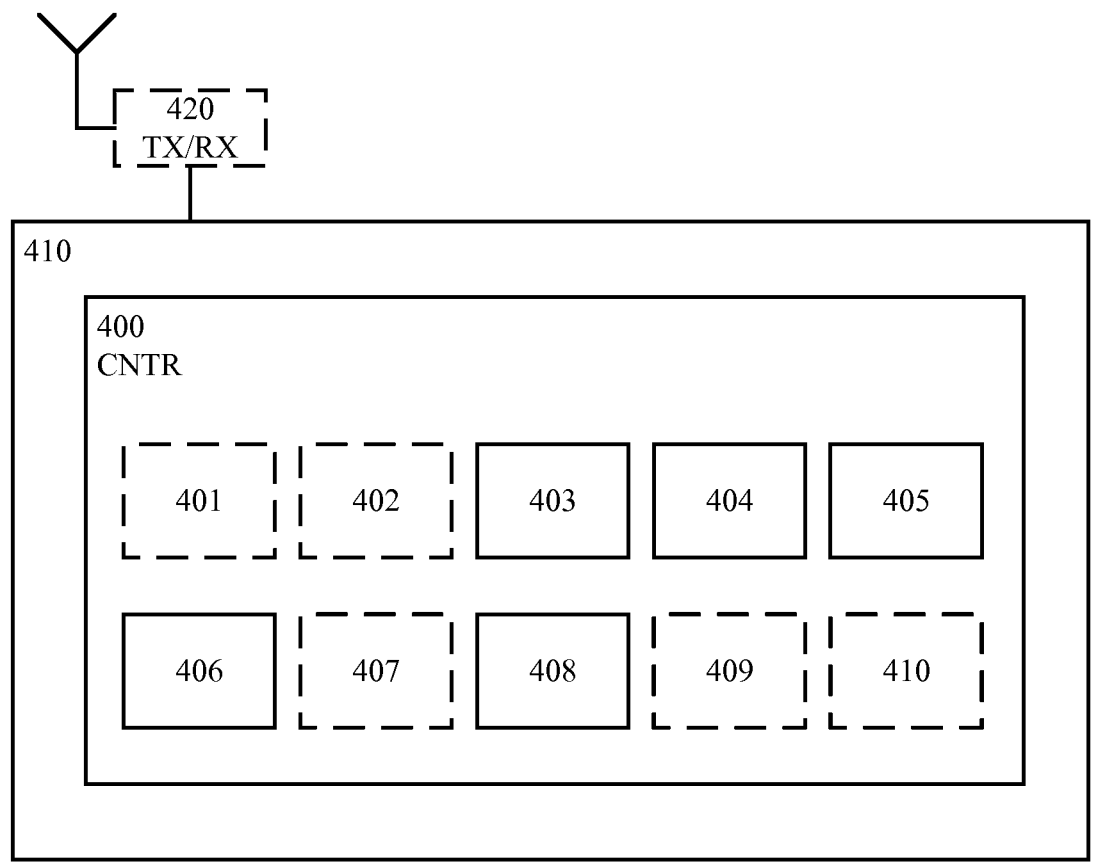
FIG. 4 is a schematic block diagram illustrating an example arrangement according to some embodiments.

FIG. 4 is a schematic block diagram illustrating an example arrangement 410 according to some embodiments. The example arrangement 410 is for registering user profiles and for transitioning between user profiles in an electronic user device during use of the electronic user device wherein the electronic user device comprises a fingerprint sensor operatively connected to a touch sensor of the electronic user device. Thus, the example arrangement 410 may, for example, perform the method steps of any of FIG. 1, FIG. 2, FIG. 3*c*, and FIG. 3*d*.

The arrangement 410 comprises device controlling circuitry (CNTR; e.g., a controller or a controlling module) 400, which may in turn comprise (or be otherwise associated with; e.g., connected or connectable to) a sensing module 403, e.g. sensing circuitry, configured to sense at least a part of a fingerprint by the fingerprint sensor at a determined position and area of a detected touch, and a determining module 404, e.g. determining circuitry, configured to determine, by a fingerprint controller configured to control the fingerprint sensor, whether the sensed part of the fingerprint corresponds to a registered user or a non-registered user of the electronic user device.

The CNTR 400 may further comprise (or be otherwise associated with; e.g., connected or connectable to) an authenticating module 405, e.g. authenticating circuitry, configured to authenticate the registered user based on the sensed fingerprint, and a settings module 406, e.g. settings circuitry, configured to apply settings of a user profile associated with the registered user in the electronic user device by a settings controller configured to control the settings of the electronic user device.

In some embodiments, the CNTR 400 further comprises a determining module 402, e.g. determining circuitry, configured to determine the position and the area of the detected touch on the touch sensor by a touch sensor controller configured to control the touch sensor.

In some embodiments, the CNTR 400 further comprises a scanning module 401, scanning circuitry, configured to scan the touch sensor for detecting one or more touches on the touch sensor.

In some embodiments, the CNTR 400 further comprises a locking module 407, e.g. locking circuitry, configured to set the electronic user device in a locked mode in response to repeated determining of a non-registered user of the electronic user device.

The CNTR 400 may furthermore comprise (or be otherwise associated with; e.g., connected or connectable to) a registering module 408, e.g. registering circuitry, configured to register, by a registration controller configured to control registration of user profiles, the non-registered user by associating the sensed fingerprint to a user profile associated with the user to be registered.

In some embodiments, the CNTR 400 further comprises a settings module 409, e.g. settings circuitry, configured to adjust settings of the user profile associated with the user to be registered in the electronic user device.

In some embodiments, the CNTR 400 further comprises a storage module 410, e.g. storing circuitry, configured to store the sensed fingerprint to a secure memory in the electronic user device.

The arrangement 410 may further comprise (or be otherwise associated with; e.g., connected or connectable to), in some embodiments, a transceiving module (TX/RX) 420, e.g. transceiving circuitry, configured to transmit and receive radio signals in the electronic user device.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

Figure 5:
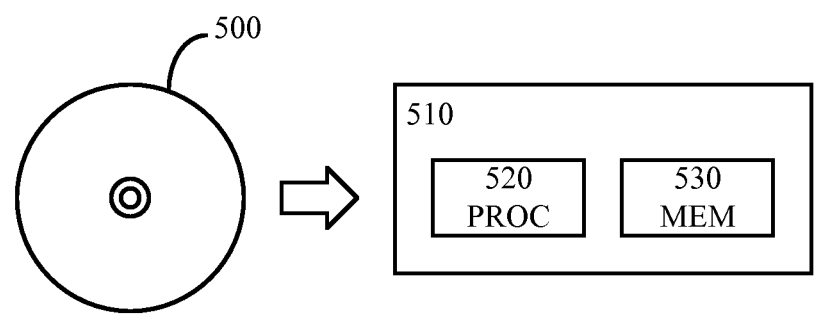
FIG. 5 is a schematic drawing illustrating an example computer readable medium according to some embodiments.

FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a wireless communication device 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, any of the methods illustrated in FIG. 1, 2, 3*c*, 3*d* or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for transitioning between user profiles in an electronic user device during use of the electronic user device, wherein the electronic user device comprises a fingerprint sensor operatively connected to a touch sensor of the electronic user device, the method comprising the following steps:
   sensing, by the fingerprint sensor, at least a part of a fingerprint at a determined position and area of a detected touch,
   determining, by a fingerprint controller configured to control the fingerprint sensor, whether the sensed part of the fingerprint corresponds to a registered user of the electronic user device, and
   when the sensed part of the fingerprint corresponds to a registered user of the electronic user device:
   authenticating the registered user based on the sensed fingerprint, and
   applying, by a settings controller configured to control the settings of the electronic user device, settings of a user profile associated with the registered user in the electronic user device;
   wherein the method further comprises repeating the steps at a frequency corresponding to a set security level.

2. The method of claim 1, further comprising the step of:
   determining, by a touch sensor controller configured to control the touch sensor, the position and the area of the detected touch on the touch sensor.

3. The method of claim 1, further comprising the steps of:
   repeating the determining and sensing steps for every detected touch on the touch sensor.

4. The method of claim 1, wherein the set security level is set by the registered user and/or owner of the electronic user device.

5. The method of claim 1, further comprising the step of:
   scanning the touch sensor for detecting one or more touches on the touch sensor.

6. The method of claim 5, wherein the scanning of the touch sensor comprises scanning at least a part of the touch sensor on a first side of the electronic user device and/or at least a part of the touch sensor on a second side of the electronic user device and/or at least a part of the touch sensor on a third side of the electronic user device.

7. The method of claim 5, wherein the scanning of the touch sensor comprises scanning a whole area or a dedicated area of the touch sensor.

8. The method of claim 1, wherein use of the electronic user device is defined as the electronic user device being in an unlocked mode.

9. The method of claim 1, further comprising the step of:
   setting the electronic user device in a locked mode in response to repeatedly determining that the sensed part of the fingerprint corresponds to a non-registered user of the electronic user device.

10. A method for registering user profiles for transitioning between user profiles in an electronic user device during use of the electronic user device, wherein the electronic user device comprises a fingerprint sensor operatively connected to a touch sensor of the electronic user device, the method comprising the following steps:
    sensing, by the fingerprint sensor, at least a part of a fingerprint at the determined position and area of the detected touch,
    determining, by a fingerprint controller configured to control the fingerprint sensor, whether the sensed part of the fingerprint corresponds to a non-registered user of the electronic user device, and
    when the sensed part of the fingerprint corresponds to a non-registered user of the electronic user device:
    registering, by a registration controller configured to control registration of user profiles, the non-registered user by associating the sensed fingerprint to a user profile associated with the user to be registered.

11. The method of claim 10, further comprising the step of:
    determining, by a touch sensor controller configured to control the touch sensor, the position and the area of the detected touch on the touch sensor.

12. The method of claim 10, further comprising the steps of:
    repeating the steps for every detected touch on the touch sensor, and/or repeating the steps at a frequency corresponding to a set security level.

13. The method of claim 12, wherein the set security level is set by a registered user and/or owner of the electronic user device.

14. The method of claim 10, further comprising the step of:
adjusting settings of the user profile associated with the user to be registered in the electronic user device.

15. The method of claim 10, wherein registering the non-registered user is performed during a specified time window.

16. The method of claim 10, wherein the registering the non-registered user further comprises storing the sensed fingerprint to a secure memory in the electronic user device.

17. An apparatus for transitioning between user profiles in an electronic user device during use of the electronic user device wherein the electronic user device comprises a fingerprint sensor operatively connected to a touch sensor of the electronic user device, the apparatus comprising:
a memory comprising executable instructions and one or more processors configured to communicate with the memory, whereby the one or more processors are configured to cause the following operations:
sensing, by the fingerprint sensor, of at least a part of a fingerprint at a determined position and area of a detected touch,
determination, by a fingerprint controller configured to control the fingerprint sensor, of whether the sensed part of the fingerprint corresponds to a registered user of the electronic user device, and
when the sensed part of the fingerprint corresponds to a registered user of the electronic user device:
authentication of the registered user based on the sensed fingerprint, and
application, by a settings controller configured to control the settings of the electronic user device, of settings of a user profile associated with the registered user in the electronic user device;
wherein the one or more processors are further configured to repeatedly cause the operations, at a frequency corresponding to a set security level.

18. The apparatus of claim 17, wherein the one or more processors are further configured to cause the apparatus to:
determination, by a touch sensor controller configured to control the touch sensor, of the position and the area of the detected touch on the touch sensor.

19. The apparatus of claim 17, wherein the one or more processors are further configured to cause the apparatus to:
scan the touch sensor for detecting one or more touches on the touch sensor.

20. The apparatus of claim 19, wherein the scan of the touch sensor further comprises scan of at least a part of the touch sensor on a first side of the electronic user device and/or at least a part of the touch sensor on a second side of the electronic user device and/or at least a part of the touch sensor on a third side of the electronic user device.

21. The apparatus of claim 17, wherein the one or more processors are further configured to cause the apparatus to:
set the electronic user device in a locked mode in response to repeated determination that the sensed part of the fingerprint corresponds to a non-registered user of the electronic user device.

22. An apparatus for registering user profiles for transitioning between user profiles in an electronic user device during use of the electronic user device wherein the electronic user device comprises a fingerprint sensor operatively connected to a touch sensor of the electronic user device, the apparatus comprising:
a memory comprising executable instructions and one or more processors configured to communicate with the memory, whereby the one or more processors are configured to cause:
sensing, by the fingerprint sensor, of at least a part of a fingerprint at a determined position and area of a detected touch,
determination, by a fingerprint controller configured to control the fingerprint sensor, of whether the sensed part of the fingerprint corresponds to a non-registered user of the electronic user device, and
when the sensed part of the fingerprint corresponds to a non-registered user of the electronic user device:
registration, by a registration controller configured to control registration of user profiles, of the non-registered user by associating the sensed fingerprint to a user profile associated with the user to be registered.

23. The apparatus of claim 22, wherein the one or more processors are further configured to cause the apparatus to:
determine, by a touch sensor controller configured to control the touch sensor, of the position and the area of the detected touch on the touch sensor.

24. The apparatus of claim 22, wherein the one or more processors are further configured to cause the apparatus to:
adjust settings of the user profile associated with the user to be registered in the electronic user device.

25. The apparatus of claim 22, wherein the one or more processors are further configured to cause the apparatus to:
register the non-registered user during a specified time window.

26. The apparatus of claim 22, wherein the one or more processors are further configured to cause the apparatus to:
store the sensed fingerprint to a secure memory in the electronic user device at registration of the non-registered user.

* * * * *